United States Patent

[11] 3,540,460

| [72] | Inventor | Edward J. Purcell |
| | | Evanston, Illinois |
| [21] | Appl. No. | 655,429 |
| [22] | Filed | July 24, 1967 |
| [45] | Patented | Nov. 17, 1970 |
| [73] | Assignee | I-T-E Imperial Corporation |
| | | a corporation of Delaware |

[54] SAFETY CONTROL
14 Claims, 6 Drawing Figs.

| [52] | U.S. Cl. | 137/81.5 |
| [51] | Int. Cl. | F15c 1/12 |
| [50] | Field of Search | 137/81.5; |
| | | 235/201; 74/consulted |

[56] References Cited
UNITED STATES PATENTS

| 3,107,850 | 10/1963 | Warren et al. | 137/81.5 |
| 3,292,648 | 12/1966 | Colston | 137/81.5 |
| 3,443,575 | 5/1969 | Hughes | 137/81.5 |

Primary Examiner—M. Cary Nelson
Assistant Examiner—William R. Cline
Attorney—Hofgren, Wegner, Allen, Stellman and McCord ABSTRACT: A fluidic control circuit for initiating each cycle of a machine only when two switches are manually closed by the operator within a predetermined time period including a fluidic OR/NOR gate used as a sensor for providing a NOR output to a machine cycle starter when no fluid input signals are applied with each of the switches arranged to decrease one of the fluid input signals and with a capacitive circuit for thereafter increasing the input signals to OR output level after the predetermined time has lapsed.

Patented Nov. 17, 1970 3,540,460
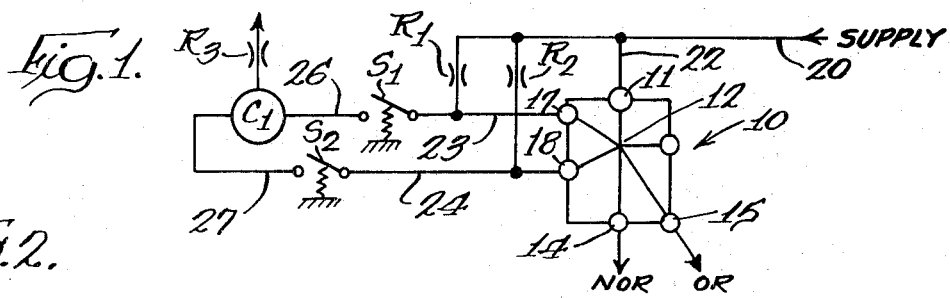
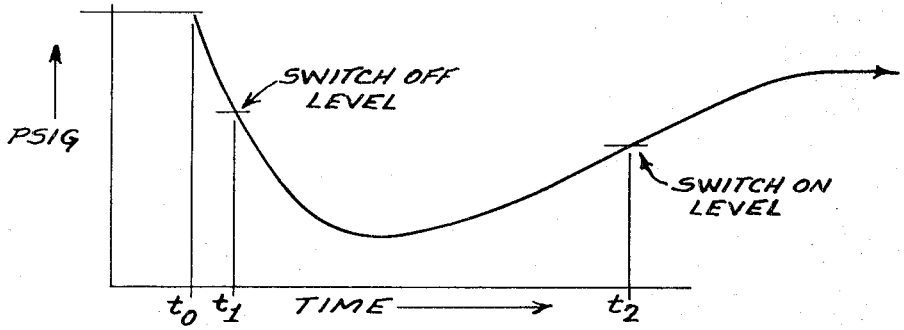
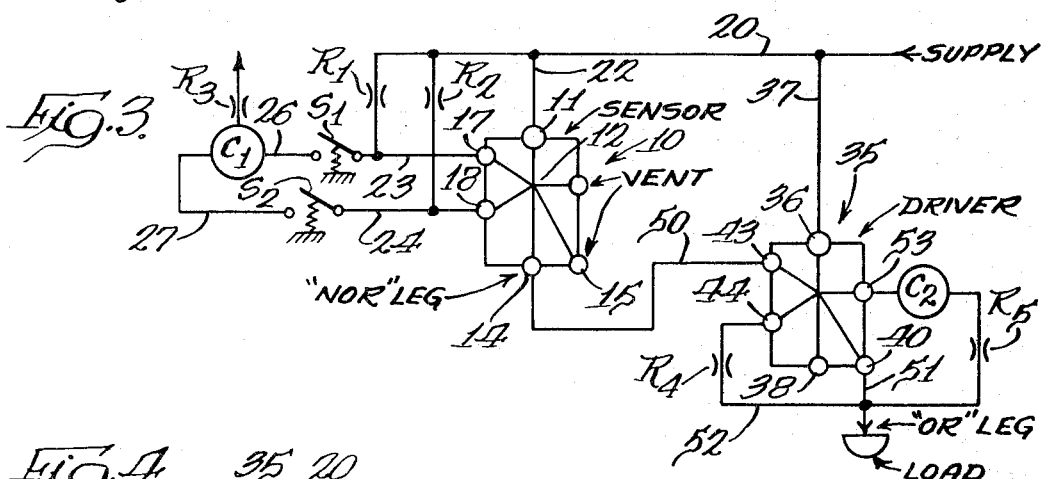
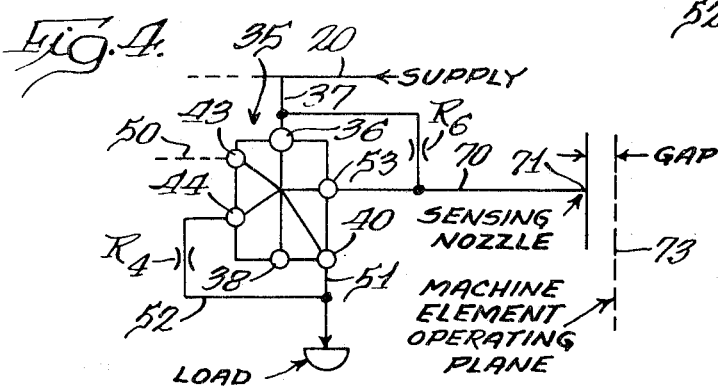
Inventor:
Edward J. Purcell
By Hofgren, Wegner,
Allen, Stellman & McCord
Att'ys

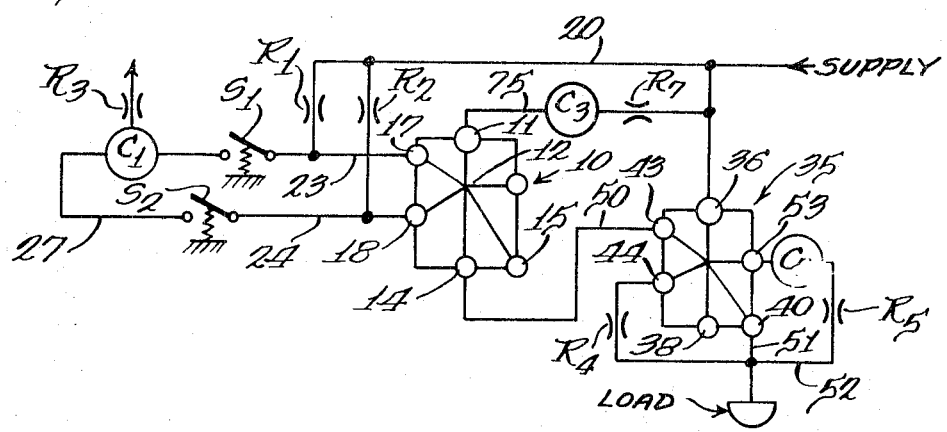

SAFETY CONTROL

BACKGROUND OF THE INVENTION

The present invention relates to a control circuit for ensuring the safe operation of punch presses and other hazardous machines, and even more broadly to systems which require the near simultaneous occurrence and overlap of two signals to provide a useful output signal.

Various electrical and hydraulic controls have been provided in the past for making necessary the near simultaneous actuation of two switches for operating dangerous mechanisms to prevent the operator's hands or other appendages from being in the region of danger during operation of the associated machine. There have also been provided various guards and arm shackles to protect the operator in the past, but these have resulted in discomfort and operating inefficiency. The electrical and hydraulic systems provided in the past have been inadequate because of the required plurality of electronic components and/or moving parts being beyond the maintenance capabilities of many users.

SUMMARY OF THE INVENTION

The present safety control operates on a readily available fluid supply and employs fluidic components having no moving parts to achieve the desired logical function. The fluidic logic devices as presently arranged allow the construction of a control system which carries information through a fluid stream and requires no moving parts other than the fluid itself. The inherently high reliability of these devices as well as the manner of arranging them and the ease of maintenance thereof provide a control giving high accuracy of operation. Therefore, the present control is particularly suitable as a safety control for industrial machinery as such an environment demands a highly reliable control, for a malfunction could result in injury to the personnel involved.

The present control incorporates a fluidic OR/NOR gate as the main sensing element for indicating the absence of both of two input signals, the input signals being removed by selectively connecting the two input ports of the fluidic device to a capacitance through two manually operable switches. The capacitance causes a replenishing of the input signal associated with the closed switch after a predetermined time lapse. After one of the inputs is reinstated, the subsequent closure of the other switch will not provide a useable output from the gate. Thus, the basic laws of thermodynamics define pressure changes of the fluid media at the input (control) ports arising from the expansion of a confined fluid mass (in the capacitance) into a new larger volume. When the signal lines to the control ports of the fluidic gate are initially exposed to this capacitance, a reduction in pressure according to these laws is observed.

The gradual replenishing of fluid pressure at the control ports is a result of the resupplying of fluid continually to the ports at a rate exceeding that bled from the capacitance so that the fluid in the capacitance will display an increasing internal pressure as the resupply of fluid continues. This replenishing flow rate causes a pressure increase at one of the ports, or both, sufficient to maintain the sensing gate in the no output state. The time for this reinstatement of the control signal is definable as a function of the flow rates in and out of the capacitance. The present invention employs this time for reinstatement as a timing function making multiple switch operation a necessity for machine movement and also requiring operation of the switches within a settable prescribed time interval.

BRIEF DESCRIPTION OF THE DRAWINGS

FIG. 1 is a schematic diagram of the basic elements of the present control circuit;

FIG. 2 is a graph showing the variation in control signal pressure with time for a portion of the circuit shown in FIG. 1;

FIG. 3 is another embodiment of the present invention employing a fluidic memory device as a driver for the load;

FIG. 4 is a schematic diagram of an alternative driver arrangement for the fluidic circuit shown in FIG. 3;

FIG. 5 is a schematic diagram of still another similar fluidic circuit, and

FIG. 6 is a schematic diagram of a further embodiment employing a pneumatic relay as the load driver.

DESCRIPTION OF THE PREFERRED EMBODIMENTS

Referring to the drawings and more particularly to FIG. 1 wherein the basic control arrangement according to the present invention is shown, a fluidic OR/NOR gate 10 is provided for sensing the absence of two input (or control) signals. The details of the sensor or OR/NOR gate 10 form no part of the present invention and will not be described herein except insofar as the function thereof relates to the operation of the present circuit. Briefly, therefore, the gate 10 includes a supply port 11 through which the primary flow of fluid (e.g., air, but liquid may be used also) is supplied to the gate. Supply flow from the supply port 11 passes through an interaction region 12 and issues from the gate through one of the NOR outlet ports 14 or OR outlet ports 15. By means of the already well-known wall attachment, or Coanda effect, the gate 10 has a preferred outlet in NOR outlet port 14. Therefore, in the absence of other fluid signals applied to the gate 10, supply fluid applied to port 11 will emit from the gate through NOR port 14, so when other signals modify the supply stream such that it issues from OR port 15 and subsequently these signals are removed, supply flow will switch automatically back to NOR port 14.

The sensor gate 10 is therefore referred to herein as a monostable device.

Also provided in the fluidic gate 10 are control or input ports 17 and 18 which direct fluid applied thereto into the interaction region 12 impinging against supply flow from port 11. When the fluid pressure applied to either or both of the ports 17 and 18 reach a predetermined value the interaction of the fluid streams will cause outlet flow to be switched from NOR port 14 to OR port 15. Thus gate 10 provides its OR function by issuing an output signal from OR port 15 when the fluid pressure applied to either or both of the input ports 17 and 18 increases above a predetermined value, and it provides its NOR function when it provides an output signal from NOR port 14 when the fluid pressure applied to both of the control ports 17 and 18 decreases below a predetermined value. It is the NOR logic of gate 10 that forms the basis for its incorporation into the present control circuit.

Fluid supply line 20, which may be connected to a suitable source of fluid under pressure such as air, is connected to supply fluid to port 11 through line 22, and also to the input ports 17 and 18 through resistors $R_1$ and $R_2$, respectively, which communicate with lines 23 and 24, in turn continuously communicating with their associated ports. The resistors $R_1$ and $R_2$ are selected to provide the appropriate pressure levels at the input ports and also function to prevent the loss of supply pressure in line 20.

Two operator controlled switches $S_1$ and $S_2$ actually take the form of monostable valves which in the open position block flow from lines 23 and 24 (to the left). Valves $S_1$ and $S_2$ are the type that when closed connect lines 23 and 24, respectively, with lines 26 and 27, and when released by the operator automatically open blocking communication between these lines.

From this it is apparent that switches $S_1$ and $S_2$ serve to connect either selectively or simultaneously the control ports 17 and 18 respectively, to a capacitor $C_1$, without blocking the supply of fluid from supply line 20 to lines 23 and 24. The capacitor $C_1$ consists of an enlarged chamber to which fluid supplied to lines 23 and 24 may flow when the associated switch is closed. A fluid bleed through resistor $R_3$ is provided from the capacitor $C_1$.

As illustrated graphically in FIG. 2 the capacitor $C_1$ is sized with respect to the supply flow in line 20 and the fluidic gate 10 such that when one of the switches $S_1$ and $S_2$ is connected thereto the pressure at the associated ports 17 and 18 falls below the switch "off" or sensor "off" pressure level so that in the absence of the other control signal the fluid output would be switched from OR outlet port 15 to NOR outlet port 14. The switch "off" pressure level then is that pressure at each of the ports 17 and 18 below which it is incapable of maintaining (by itself) the supply stream directed to the OR outlet 15. Furthermore, the bleed through $R_3$ is selected with respect to the rate of supply flow through resistors $R_1$ and $R_2$ such that the capacitor $C_1$ will display an increasing internal pressure as the resupply continues with one or both of the switches $S_1$ and $S_2$ closed as shown in the increasing portion of the pressure curve as $t_2$ is approached in FIG. 2. This increasing internal pressure reinstates pressure at the input ports 17 and/or 18 (depending upon whether one or both of the switches are closed) above the value required to switch or maintain the outlet flow in gate 10 through OR port 15. In the circuit shown outlet flow in OR port 15 is not utilized as a control signal for the associated machine.

The function of the circuit shown in FIG. 1 will be more clear from the following description of operation. It should be assumed the control circuit is connected such that output flow from the NOR leg 14 is utilized in some associated device to initiate a cycle of operation in the associated machine. Furthermore, let it be assumed that it is desired that this operation be initiated only when switches $S_1$ and $S_2$ are closed within a predetermined period and that the switch closures must overlap for a period of time. With the switches in the open position as shown in the drawing supply flow will be applied to both control ports 17 and 18 causing deflection of the supply stream to OR port 15 so that no cycle of operation is initiated.

If the operator depresses one of the switches, say for example switch $S_1$, line 23 will be connected to the capacitor $C_1$ and the pressure in line 23 will decay as a result of the fluid expansion in capacitor $C_1$ according to the pressure wave shown in FIG. 2, and rapidly fall below the switch "off" pressure level at time $t_1$. However, the pressure at both ports 17 and 18 must fall below the switch "off" pressure level at the same time before the fluidic gate will switch to the NOR output port 14.

With switch $S_1$ still closed (and switch $S_2$ open), pressure will continue to drop in line 23 as the fluid continues expansion in capacitor $C_1$. However, since the rate of resupply of fluid across resistor $R_1$ exceeds the bleed rate through resistor $R_3$ the pressure in the capacitor $C_1$ and line 23 will begin increasing and continue above the switch "on" level indicated at time $t_2$ in FIG. 2. The switch "on" pressure is that minimum pressure required at either of the ports 17 or 18 sufficient (by itself) to maintain flow from OR outlet port 15 (or with flow from outlet 14 to outlet 15). Since in this case only switch $S_1$ has been closed between the interval $t_1$ and $t_2$, flow was never switched from port 15 to port 14 so that the fall and rise in pressure at port 17 would have no affect on the output. Thus the machine cycle would not have been initiated. The same result would, of course, occur if switch $S_2$ had been closed without switch $S_1$.

If during an interval of time $t_1$ to somewhat less than $t_2$ the operator closes switch $S_2$ when switch $S_1$ is closed, the pressure in line 24 will decay as the pressure at that time in capacitance $C_1$ is less than in line 24. It should be noted that the combined pressure decay and buildup curve when both switches $S_1$ and $S_2$ are closed would be somewhat different than that shown in FIG. 2, although it would be similar. The pressure in line 24 and port 18 will then fall below its switch "off" level approaching the pressure in port 17 (at a time when the pressure in port 17 is already below its switch "off" level) and flow from gate 10 will switch to NOR outlet port 14 providing the useful output we have assumed for initiation of the associated machine cycle operation. The outlet flow in the NOR leg will remain only until time $t_2$ when it switches back to the OR leg.

It is apparent from the above that if one of the switches $S_1$ and $S_2$ is closed for a time period greater than $t_2$, the initiation of the other switch after time $t_2$, whether or not the first switch is still closed, cannot possibly provide a NOR output from gate 10 as the control port associated with the first switch has returned to a pressure above the switch "on" level. Also, if one of the switches is opened prior to closure of the other switch, even within the time period $t_1$ to $t_2$, the control port associated with the open switch will rapidly rise above the switch "on" pressure level preventing the gate from switching to the NOR output leg when the other switch is closed.

The control circuit described above with respect to FIG. 1 provides an output signal upon a predetermined time lapsed operation of a plurality of switches. Because of the inherent (or automatic) reinstatement of the input signals at the control ports however, and the resulting output signal of limited duration, it may be necessary in some applications such as when operating a machine cycle to apply the NOR output signal from the sensor 10 to another gate utilized to provide a memory and turn off function. That is, the signal from the sensor 10 may not be sufficiently enduring to drive the ultimate mechanical components through the distance required for a machine function.

To provide an output signal sufficient to drive the ultimate mechanical component, a driver 35 may be provided as shown in FIG. 3. The supply line 20, the sensor 10 and the capacitive circuit associated therewith shown in FIG. 3 is identical to that shown in FIG. 1 so that the same reference numerals have been applied thereto.

The driver 35 may take the form of an OR/NOR gate fluidic device similar to the OR/NOR gate 10. It includes a supply port 36 supplied fluid from supply line 20 through line 37. NOR outlet leg or port 38 is the "preferred" outlet but outlet flow in that leg is not utilized. OR outlet port 40 is utilized to supply fluid to drive the load. Control ports 43 and 44 are provided such that when a fluid signal is applied to either or both outlet flow will be provided in OR port 40, and in the absence of fluid signals in both ports 43 and 44 flow will be switched to the NOR outlet port 38.

Upon the occurrence of a signal from sensor 10 through line 50 the driver 35 will be switched to the OR outlet 40. Assuming the load to have a high impedance, a pressure buildup will result in output conductor 51. This causes fluid diversion through feedback conduit 52 sufficient to maintain a holding signal through resistor $R_4$ at control port 44. This feedback loop provides a memory function in the driver device 35 permitting a load applied signal of any desired duration following a short term signal from the sensor 10.

In certain applications it is necessary to ensure single cycle operation by terminating the driving signal from the driver 35 prior to the completion of a cycle so that the cycle initiation mechanism (not shown) may be reset and readied for another cycle. An example of this is a mechanical flywheel operated press where a tang is removed upon the application of the load signal allowing a spring loaded plunger to engage the flywheel to deliver energy to the press drive train. To ensure single cycle operation in such an application a return loop through resistor $R_5$ and capacitor $C_2$ is provided to a control port 53 opposing port 44 producing a time delay of desired value. A signal at control port 53 will shift the output back to NOR output 38, even with an input signal at port 44, since the input at control port 43 has terminated and thus the output flow in conduit 51 was maintained solely by feedback flow in port 44. The output from driver 35 will remain in NOR output 38 until the occurence of another cycle initiation signal from sensor 10. Thus, the supply of fluid to the load may be terminated at a preselected time after initial cycle initiation switching occurs.

As an alternative to the predetermined time reset for the driver 35 as described with reference to FIG. 3, the driver 35 may be reset in response to a portion of the machine arriving at a predetermined location. Such a circuit is shown in FIG. 4 where the driver 35 is shown identical in construction to the driver 35 in FIG. 3. The sensor 10 and the associated supply and capacitive circuits have been eliminated in FIG. 4 for simplicity, but it should be understood that the sensing circuit associated therewith operates in the same manner as that disclosed and described with reference to FIG. 1. In the FIG. 4 construction a bleed path through resistor $R_6$ is provided so that supply flow at a reduced pressure is delivered to line 70 which has an open end 71 positioned so that near cycle completion a mechanical machine element will move into plane 73 back impeding line 70. Thus, sensing line 70 recognizes the position of a mechanical element as an analog of cycle completion.

The back impeding of line 70 will cause a pressure rise at control port 53 effecting a turning off of the gate 10 i.e., a return to its normal or preferred state delivering fluid through NOR outlet port 38.

In certain applications it may be desirable to employ a bistable device in place of the monostable driver 35 and in such a case no holding loop via resistor $R_1$ would be required. However, the monostable device disclosed in the drawing is preferred in that without any guiding circuitry it starts up in the off or NOR leg. This feature is of general advantage in that no random stroking of the machine will occur when it is first turned on.

To further insure that no cycle of the machine will be initiated when the control is first turned on a delay circuit may be provided to assure initial output from the sensor 10 in the OR outlet port 15 rather than the load initiating NOR outlet port 14. Towards this end and as shown in FIG. 5 a capacitor $C_3$ and resistor $R_7$ are provided in line 75 supplying fluid from supply line 20 to supply port 11 of sensor 10. This delays the supply flow to sensor supply port 11 with respect to the supply flow to the sensor input ports 17 and 18. Thus, the sensor control signals at ports 17 and 18 will be applied prior to the pressure buildup in capacitor $C_3$ so that when the supply stream enters the interaction region 12 it will be directed immediately to the OR leg 15. This delay circuit combined with the driver 35 NOR start up logic provides an initial "hold" state in the system which can be removed only by the switching technique described above. The other portions of the circuit shown in FIG. 5 are identical to those described above with reference to FIG. 3 so that further description is not believed necessary.

It should be noted that in all the constructions described above that if the operator tied down one or both of switches $S_1$ or $S_2$ permanently, further operation of the control would not be possible because the capacitor pressure curve would be above its reinstatement or switch "on" level and thereafter recycling can be accomplished only by the cutoff of the supply to the capacitor permitting bleed through resistor $R_3$ to some lower pressure below the switch "off" level.

A further arrangement of the present circuit is shown in FIG. 6 wherein a sensor 80 is provided of generally the same configuration as the sensor 10 in the other embodiments except that an additional control port 82 is provided. The supply circuit for supplying fluid to supply port 83 and control ports 84 and 85 is identical to that described above with respect to FIGS. 1 and 5 so that repetition is believed unnecessary and the same reference numerals have been employed to designate identical parts.

Gate 80 has a preferred NOR outlet port 87 and an OR outlet port 88, along with a control port 90 which switches flow from port 88 to the preferred port 87 even in the presence of flow in one or both of the ports 84 and 85. When sensor 80 senses the overlapped actuation of switches $S_1$ and $S_2$ within the required interval, a signal in line 90 results shifting a three-way valve 92 from its drain position shown to the right to a position connecting supply line 93 with a driving actuator cylinder 94 through line 95. Valve 92 has a movable valve member 97 biased by a spring 98 to its inactive position shown draining line 95 to exhaust. Fluid pressure in chamber 99 from NOR output line 90 is sufficient to shift plunger 97 to the right connecting supply line 93 with actuator line 95 thereby driving the load to the right. A holding feedback loop is provided through resistor $R_9$ and control port 90. Fluid pressure in load line 95 is applied through resistor $R_{10}$ and capacitor $C_6$ to the additional port 82 causing a reset of the gate 80 to its OR outlet port 88 after a predetermined pressure buildup at port 82. Note that gate 80 is sized such that with a signal at port 90 flow will be held in port 87 even with the presence of signals at control ports 84 and 85 but not with the presence of a signal at port 82.

As in the previously described switch sensor arrangements, the monostable device 80 will show no useable outlet until neither 84 and 85 control inputs exist. With no signal at port 82 (starting mode) the simultaneous operation of switches $S_1$ and $S_2$ within the predetermined time interval will cause switching to NOR outlet 87 causing a rapid rise in pressure in line 90 maintained by the holding circuit to antiport 90. The shifting of valve 92 resulting in the application of driving fluid to the actuator 94 causes a gradual increase in pressure at control port 82, and when this pressure at port 82 reaches the "on" value the gate 80 is returned to its OR posture and the pressure in passage 90 rapidly falls. Thus, a square wave output in line 90 of the desired duration is provided and a recycle is possible after the release of switches $S_1$ and $S_2$. In the construction shown in FIG. 6 a portion of the load circuit itself is employed for the intelligence used in the basic control circuit.

It should be understood that all of the control circuits described above are shown in the drawings as purely schematic circuitry and it should be understood that the actual components may take various packaging forms such as that disclosed in the U.S. Pat. application of Edward J. Purcell and Lance A. Jahnke, filed Dec. 15, 1966, entitled "Fluid Circuit Package", Ser. No. 601,919, assigned to the assignee of the present invention.

I claim:

1. A fluid circuit providing an output signal in response to the occurrence and maintenance of two conditions within a predetermined time interval comprising: fluid logic means having two fluid inputs arranged so that a fluid output signal is provided in response to a decrease in both of said inputs, means for substantially continuously supplying fluid to both of said inputs and means for decreasing the fluid input at both of said inputs, including fluid capacitor means and means for selectively connecting said inputs to said fluid capacitor means.

2. A fluid circuit as defined in claim 1 including means for discharging said capacitor when said inputs are not connected to said capacitor means.

3. A fluid circuit as defined in claim 1 wherein said capacitor means includes a single fluid capacitor in fluid communication with each of said inputs through said connecting means.

4. A fluid circuit as defined in claim 1 including second fluid logic means having an input responsive to said output signal for providing a third input signal which produces an output signal in response thereto, said second fluid logic means being monostable such that it will not normally provide an output signal in the absence of said third input signal.

5. A fluid circuit providing an output signal in response to the occurrence and maintenance of two conditions within a predetermined time interval comprising: fluid logic means having two fluid inputs arranged so that a fluid output signal is provided in response to a decrease in both of said inputs, means for supplying fluid to both of said inputs and means for decreasing the fluid input at both of said inputs, including fluid capacitor means and means for connecting said inputs to said fluid capacitor means, said connecting means including a first fluid switch communicating one of said inputs with said capacitor means when closed and blocking communication between said one input and said capacitor means when open, and a second fluid switch communicating the other of said inputs with said capacitor means when closed and blocking communication between said other input and said capacitor means when open.

6. A fluid circuit providing an output signal in response to the occurrence and maintenance of two conditions within a predetermined time interval comprising: fluid logic means having two fluid inputs arranged so that a fluid output signal is provided in response to a decrease in both of said inputs, means for supplying fluid to both of said inputs and means for decreasing the fluid input at both of said inputs, including fluid capacitor means and means for connecting said inputs to said fluid capacitor means, said capacitor means being sized such that with one of said inputs connected thereto the fluid signal at said one input will first decrease below a value required to prevent an output signal from said fluid logic means and thereafter increase above said value to prevent an output signal from said fluid logic means whereby both of said inputs must be connected to the capacitor means during a predetermined interval of time, and said capacitor means being sized to decrease the pressure at both of said inputs simultaneously to a value below said value to thereby provide an output signal from said fluid logic means upon the simultaneous connection of both of said inputs to said capacitor means.

7. A fluid circuit providing an output signal in response to the occurrence and maintenance of two conditions within a predetermined time interval comprising: fluid logic means having two fluid inputs arranged so that a fluid output signal is provided in response to a decrease in both of said inputs, means for supplying fluid to both of said inputs and means for decreasing the fluid input at both of said inputs, including fluid capacitor means and means for connecting said inputs to said fluid capacitor means, said fluid logic means having first output means and second output means, said output signal being derived from said first output means, said fluid logic means being monostable such that fluid flows through said first outlet means in the absence of said first and second input signals, supply means for supplying fluid to said fluid logic means, and means for preventing the occurrence of an output signal upon the initial application of said fluid supply means to said fluid logic means including means for delaying the application of supply fluid to said fluid logic means with respect to the application of supply fluid to said first and second inputs.

8. A fluid circuit as defined in claim 7 wherein said delay means includes a fluid capacitor.

9. A fluid circuit for controlling the operation of a device, comprising: a monostable fluid element having; a supply port, at least two outlet ports and two control ports, said element being constructed such that in the absence of fluid signals in any of said control ports a fluid output signal will be provided in one of said outlet ports and in the presence of a fluid signal at any of said control ports an output fluid signal will be provided at the other of said outlet ports, means for supplying fluid to said supply port, control means for controlling the fluid signals to said control ports, supply means for supplying fluid to said control means, and means for delaying the application of supply fluid to said supply port so that no output signal will be provided in said one of said output ports upon the application of supply fluid to said fluid element.

10. A fluid circuit as defined in claim 9 wherein said delaying means includes fluid capacitor means for delaying the application of supply fluid to said fluid element so that fluid initially is provided to the other outlet port on application of supply fluid to the fluid element.

11. A fluid circuit as defined in claim 10 including a second fluid element having a supply port, at least two outlet ports and at least two control ports, said second fluid element being monostable such that in the absence of input signals in said control ports supply fluid will be directed through one of said outlet ports, one of the control ports of said second fluid element being connected to receive the output signal from the first fluid element and provide an output signal in said other outlet port in said second fluid element, and load means responsive to the output signal from said other outlet port whereby the load may not be falsely driven.

12. A safety control for initiating the operation of hazardous machinery, comprising: fluid pressure means for initiating a cycle of operation of the machinery, a first manually operable switch, a second manually operable switch, a fluid control circuit for initiating a cycle only when both of the switches have been closed within a predetermined interval and maintained closed in overlapping fashion including a fluid element having a supply port, at least two outlet ports and two control ports, said fluid element being constructed so that in the absence of fluid signals at both of said control ports an output signal will be provided in one of said outlet ports and in the presence of a fluid signal at either of said control ports an output signal will be provided at the other outlet port, means for supplying fluid under pressure to both of said control ports, means responsive to the actuation and maintenance of said first switch for reducing the fluid pressure at one of said control ports below that value required to provide an output signal in said other outlet port and thereafter increasing the pressure at said one control port above said value, and means responsive to the actuation of said second switch for reducing the fluid pressure at the other of said control ports below that value required to provide an output in said other outlet port.

13. A fluid circuit as defined in claim 12 wherein said means responsive to the second switch subsequent to the reduction in pressure increases the pressure at said other control port above said value when the second switch is maintained actuated.

14. A safety control for initiating the operation of hazardous machinery, comprising: fluid pressure means for initiating a cycle of operation of the machinery, a first manually operable switch, a second manually operable switch, a fluid control circuit for initiating a cycle when both of the switches have been closed within a predetermined interval in overlapping fashion including a fluid element having a supply port, at least two outlet ports and two control ports, means responsive to the actuation and maintenance of said first switch for modifying the fluid signal from said first control port from a first condition to a second condition, means for automatically returning said first control fluid signal toward said first condition, means responsive to the actuation and maintenance of said second switch for modifying the fluid signal from said second control port from a first condition to a second condition, and means for automatically returning said second control fluid signal toward said first condition.